M. S. MADSEN.
HARROW.
APPLICATION FILED JAN. 10, 1911.

993,855.

Patented May 30, 1911

2 SHEETS—SHEET 1.

WITNESSES:
E. Larson
H. M. Brooks

INVENTOR
Mads S. Madsen
BY
Deeler & Cobb
Attorneys

M. S. MADSEN.
HARROW.
APPLICATION FILED JAN. 10, 1911.
993,855.
Patented May 30, 1911.
2 SHEETS—SHEET 2.
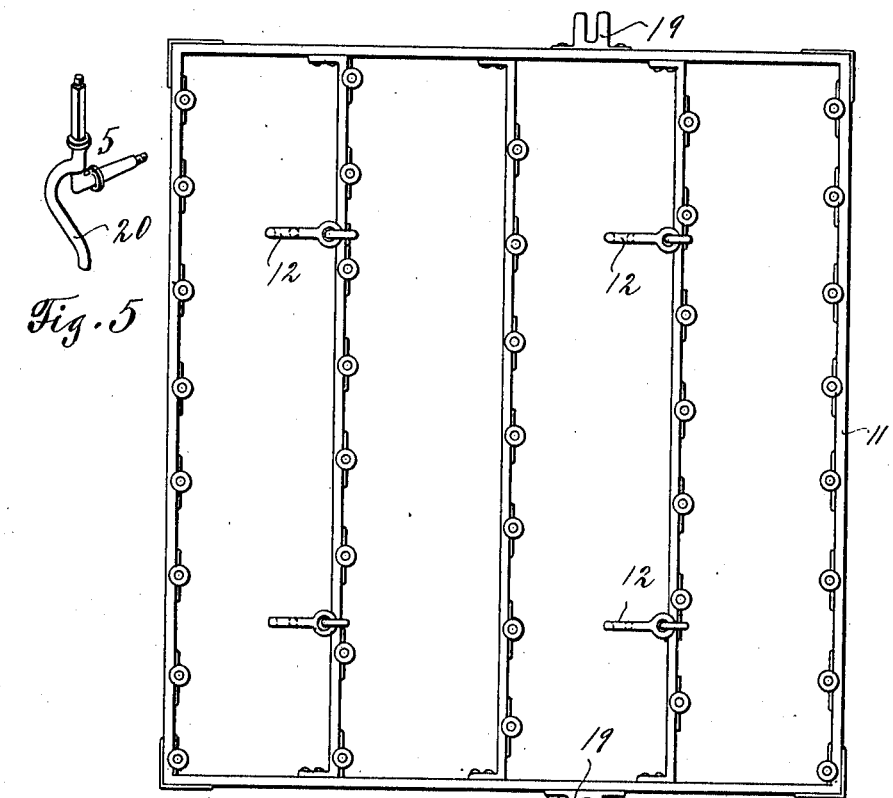
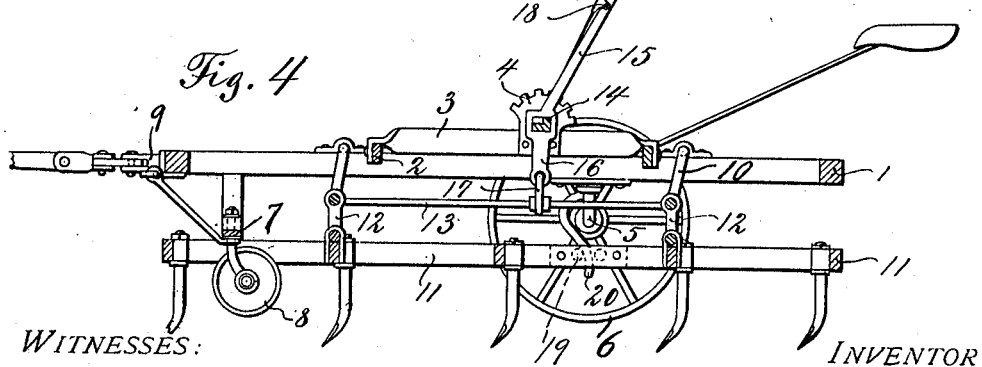
WITNESSES:
INVENTOR
Mads S. Madsen
BY
Attorneys

UNITED STATES PATENT OFFICE.

MADS S. MADSEN, OF MERNA, NEBRASKA.

HARROW.

993,855.

Specification of Letters Patent.　Patented May 30, 1911.

Application filed January 10, 1911. Serial No. 601,846.

*To all whom it may concern:*

Be it known that I, MADS S. MADSEN, a citizen of the United States, residing at Merna, in the county of Custer and State of Nebraska, have invented certain new and useful Improvements in Harrows, of which the following is a specification.

This invention is primarily designed to provide a harrow frame which may be made inoperative by raising the same from the ground, thereby facilitating the conveyance of the harrow from place to place.

A further object is to provide a wheeled main frame of novel construction for carrying the harrow frame whereby said harrow may be made inoperative or operative at the will of the operator.

With the above and other objects in view, this invention consists in the construction, combination, and arrangement of parts as hereinafter more fully described, claimed, and illustrated in the accompanying drawings, wherein—

Figure 1:
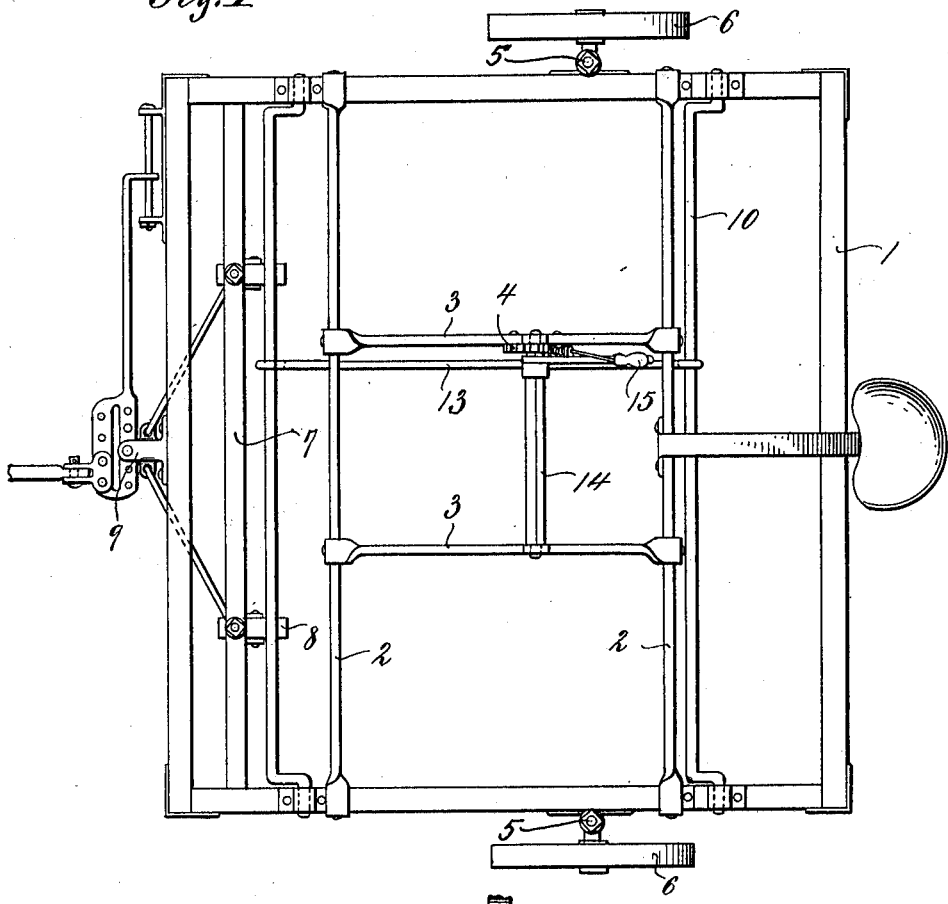
Figure 2:
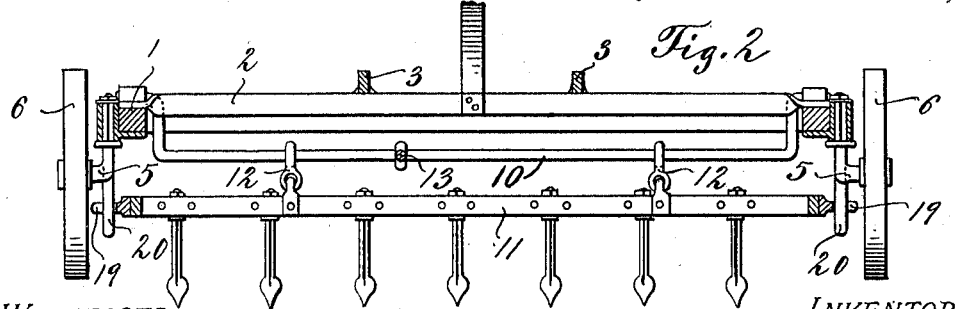

Figure 1 is a plan view of the present invention; Fig. 2 is a cross sectional view, parts thereof being in elevation; Fig. 3 is a plan view of the harrow frame; Fig. 4 is a longitudinal cross section illustrating more clearly the mounting of the harrow frame on the main frame; Fig. 5 is a detail used in the construction of the present invention.

In constructing the harrow in accordance with the present invention, a main frame 1 is provided having reinforcing bars or members 2 upon which are mounted a pair of bars 3 in transverse relation thereto. On the latter bars is mounted a quadrant 4 for the purpose hereinafter described. A vertical shaft 5 is secured to each side of the frame 1, said shafts having their lower terminals bent outwardly to a horizontal plane on which horizontal portions are mounted wheels 6. A third cross bar 7 is provided on the forward portion of the main frame on which are mounted a pair of caster wheels 8, said wheels being braced to a draft rigging 9.

A pair of crank shafts 10 are mounted on the frame 1, and are flexibly connected to an auxiliary or harrow frame 11 by the link connections 12. The crank shafts 10 are connected by a connecting or operating rod 13 whereby said shafts may be operated simultaneously. A shaft 14 is rotatably mounted on the bars 3 and carries a hand lever 15 which has an extension 16 projecting downwardly, the latter being connected to the operating rod 13 by a link connection 17. The hand lever 15 carries a spring actuated pawl 18 which is adapted to engage the quadrant 4 for retaining the harrow frame in any desired elevation, as will readily be observed. The harrow frame may be of any style desired, such as a spiked frame, as illustrated in the drawings. It will clearly be observed from the foregoing that, as the hand lever 15 is operated, the harrow frame is lowered or raised depending upon the operation of said lever.

To prevent the harrow frame from becoming inoperative when lowered into an operative position, a pair of spaced guides 19 are provided on each side of the harrow frame between which guides is adapted to pass an extension or guiding member 20 secured to the vertical shaft 5 above the horizontal portion thereof. These guiding members 20 are curved forwardly to permit the harrow frame to ride forwardly thereon when the same is being raised to an inoperative position. The lower terminal of said guiding member 20 is deflected to a vertical plane to permit any reciprocating motion imparted to the harrow frame when in an operative position.

Any suitable draft rigging may be provided for operating the harrow, as will readily be observed.

Having thus fully described my invention, what is claimed as new is:—

1. In a harrow, the combination with a wheeled body, of a plurality of crank shafts mounted thereon, a harrow frame flexibly mounted on said crank shafts, curved guiding members carried by said body, spaced guide members carried by said harrow frame guiding the latter on said guiding members, an operating member connecting said crank shafts and means carried by said body for raising and lowering said harrow frame, as set forth.

2. In a harrow, the combination with a main body, of a plurality of wheels mounted thereon, curved guiding members carried by said body, a plurality of crank shafts mounted on said body, an operating member connecting said crank shafts, a harrow frame flexibly mounted on said crank shafts, spaced guide members carried on said harrow frame for guiding the latter on said guiding members, means carried by said body for raising and lowering said harrow frame, and means carried by said guiding members to permit the necessary reciprocation of said harrow when in an operative position, as set forth.

3. In a harrow, the combination with a main body, of a plurality of vertical shafts carried thereby, said shafts being provided with horizontal portions, wheels mounted on said horizontal portions, curved guiding members carried by said body, a plurality of crank shafts mounted on said body, an operating member connecting said crank shafts, a harrow frame flexibly mounted on said crank shafts, spaced guide members carried on said harrow frame for guiding the latter on said guiding members, means carried by said body for raising and lowering said harrow frame, and means carried by said guiding members to permit the necessary reciprocation of said harrow when in an operative position, as set forth.

In testimony whereof I affix my signature in presence of two witnesses.

MADS S. MADSEN.

Witnesses:
JOHN W. KELLY,
RALPH C. RILEY.

---

Copies of this patent may be obtained for five cents each, by addressing the "Commissioner of Patents, Washington, D. C."